(No Model.) 4 Sheets—Sheet 1.

L. GRAY.
CULTIVATOR.

No. 283,775. Patented Aug. 28, 1883.

Fig. 1.

Witnesses:
B. A. Price
Albert H. Adams

Inventor:
Leroy Gray
By West & [illegible]
His Attys.

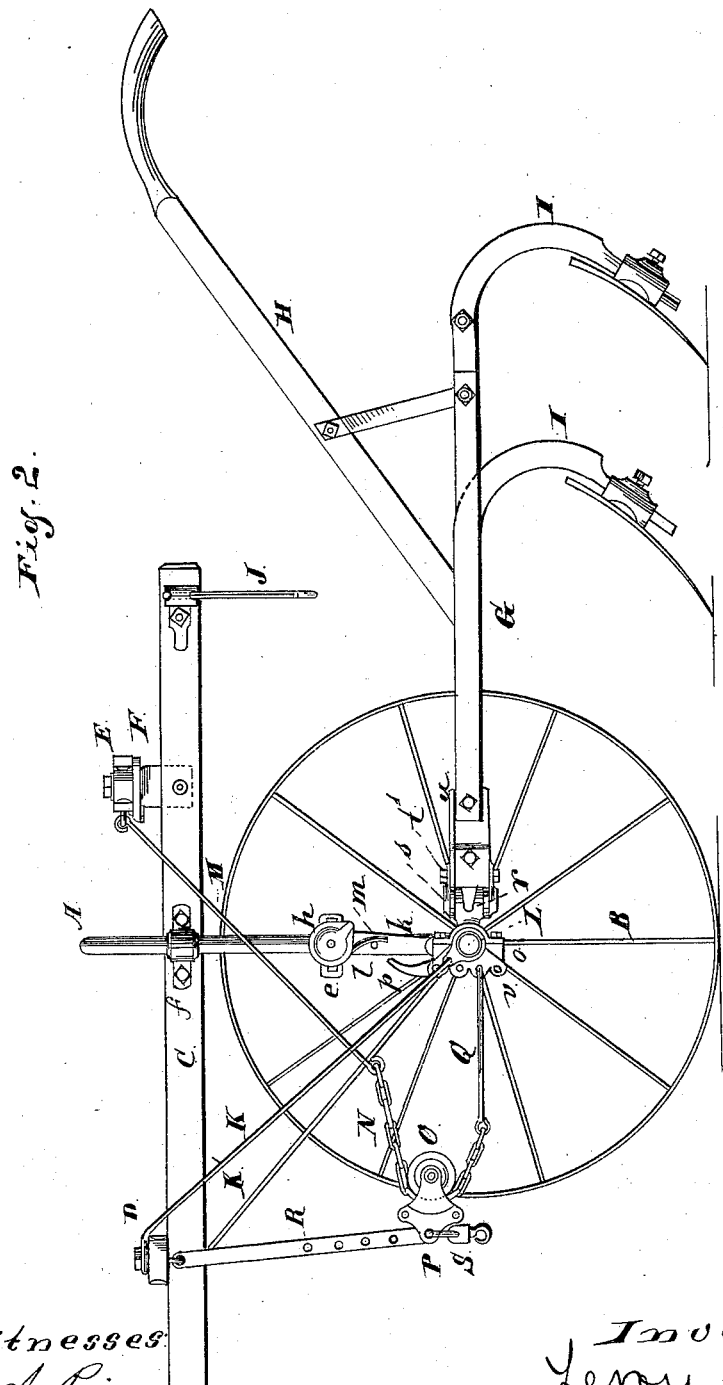

(No Model.)
4 Sheets—Sheet 3.
L. GRAY.
CULTIVATOR.
No. 283,775.
Patented Aug. 28, 1883.
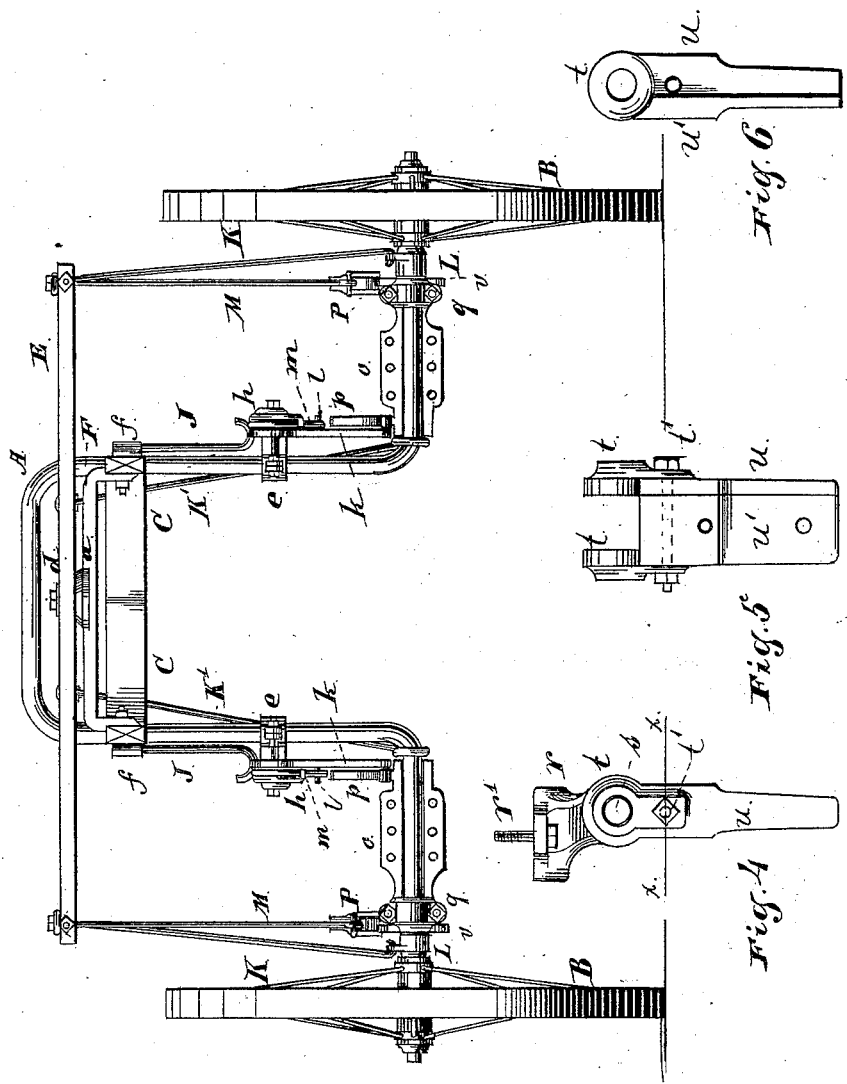
Witnesses:
B. A. Price
Albert H. Adams
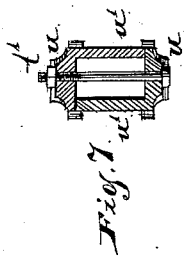
Inventor:
Leroy Gray
By West & Bond
His Attys.

(No Model.) 4 Sheets—Sheet 4.
L. GRAY.
CULTIVATOR.
No. 283,775. Patented Aug. 28, 1883.
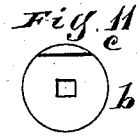
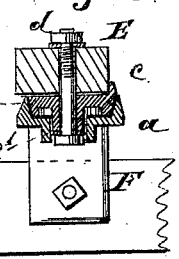
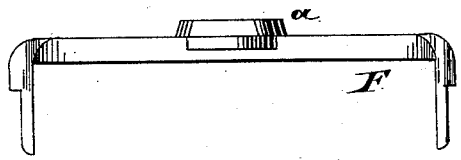
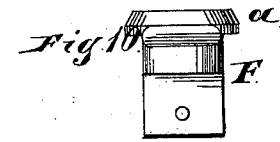
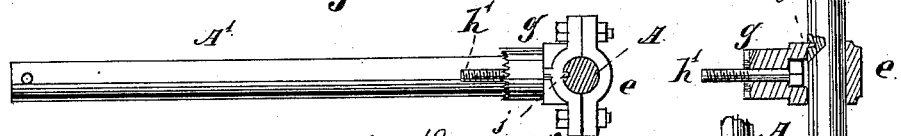
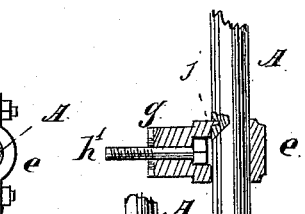
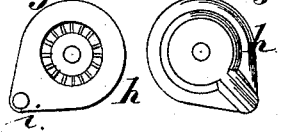
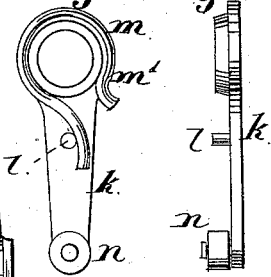
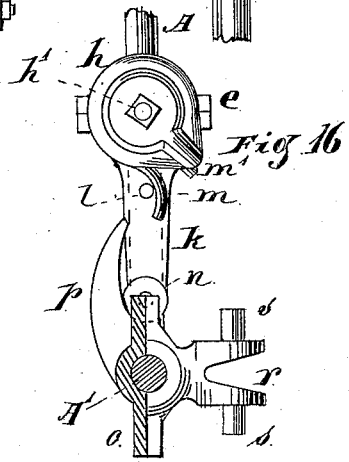
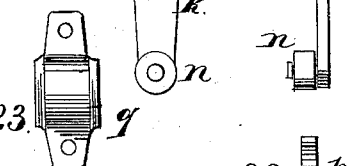
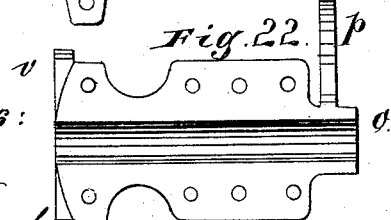
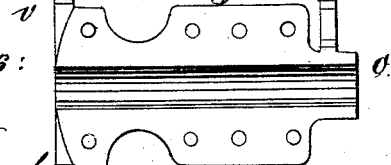
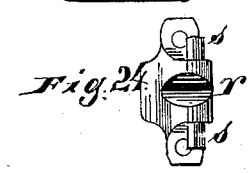
Witnesses:
B. H. Price
Albert H. Adams
Inventor:
Levy Gray
By West & Bond
His attys

UNITED STATES PATENT OFFICE.

LEROY GRAY, OF SYCAMORE, ILLINOIS.

CULTIVATOR.

SPECIFICATION forming part of Letters Patent No. 283,775, dated August 28, 1883.

Application filed November 6, 1882. (No model.)

*To all whom it may concern:*

Be it known that I, LEROY GRAY, residing at Sycamore, in the county of De Kalb and State of Illinois, and a citizen of the United States, have invented new and useful Improvements in Cultivators, of which the following is a full description, reference being had to the accompanying drawings, in which—

Figure 1 is a top or plan view; Fig. 2, a side elevation with one wheel removed; Fig. 3, a rear elevation with the plow-beams detached; Figs. 4, 5, and 6, details of the clevis or coupling-irons; Fig. 7, a cross-section on line $x$ $x$ of Fig. 4; Figs. 8, 9, 10, 11, 12, and 13, details of the evener-connections with the frame; Fig. 14, a section of the axle, showing the horizontal portion denuded of its parts; Fig. 15, a portion of the axle-arch, showing the spring clip or connection in section; Fig. 16, a section of the axle, showing the attachment of the spring and its sustaining parts with the coupling, the coupling being partly in section; Figs. 17 and 18, edge and face views of the yielding arm, the spring being shown in position in Fig. 18; Figs. 19, 20, and 21, details of the spring-cap; Figs. 22, 23, and 24, details of the beam-coupling.

The object of this invention is to improve the construction, action, and operation of straddle-row or double cultivators; and its nature consists in an improved construction and application of the parts for connecting the evener-bar with the frame for attaching the draft of the team; in an improved construction and operation of the beam-couplings; in an improved construction and operation of springs for aiding the movements of the beam, and in the several combination of parts, as hereinafter set forth and claimed as new.

In the drawings, A indicates the arched axle, and A' the horizontal end portions thereof; B, the wheels; C, the tongue; D, front cross-bar; E, evener-bar; F, rear cross-bar or plate upon which the evener is supported; G, the plow-beams; H, handles; I, standards; J, hang-up hooks; K, outer and K' inner brace-rods; L, clip or collar for the brace-rods K; M N, chain or rod and chain for connecting the evener with the hangers of the front cross-bar; O P, sheave or pulley through which the chain N passes; Q, rod connecting the chain N with the beam-coupling; R, hangers depending from the cross-bar D; S, whiffletrees; $a$, recess or socket formed in or attached to the cross-bar F; $b$, circular plate placed in the recess $a$; $c$, lip or pin on the plate $b$; $d$, bolt connecting the parts $a$, $b$, and E together, and forming the pivot for the evener; $e$, clips for holding the spring-connections to the axle; $f$, clips for attaching the tongue or frame to the axle; $g$, hubs or supports for the springs $m$; $h$, caps fitting against the ends of the hubs $g$; $h'$, bolts; $i$, projections or pins on the caps $h$, for holding the short end of the spring; $j$, pin or projection on the clip $e$ to prevent it from rotating around the axle; $k$, spring-arm; $l$, pin on the spring-arm against which the long end of the spring operates; $m$ $m'$, spring; $n$, pin or anti-friction roller on the lower end of the arm $k$; $o$, coupling-plate; $p$, curved arm or projection on the inner end of the plate $o$; $q$, cap or half-box for the outer end of the plate $o$; $r$, half-box with a rear extension for the inner part of the plate $o$; $r'$, bolts; $s$, pivot-pins for the beam-clevis; $t$, front end of the clevis-plates connected with the pins $s$ of the half-box $r$; $t'$, bolts; $u$ $u'$, angular plate forming two sides of the beam-clevis, and $v$ a forward projecting plate on the outer end of the plate $o$.

The axle A is best made of round iron and bent in the form shown.

The wheels B are or may be of the usual form, and the tongue C is made in the form known as "split," so as to form a part of the framing; but it is evident that they may be cut off at the front of the bar D, so as to leave a regular frame, and an ordinary tongue can be applied by means of the bar D and the top of the arch, as is quite common. The tongue C is attached to the axle by means of the clips $f$, and can be adjusted up and down upon the vertical parts of the axle-arch by means of said clips; but such adjustment will be seldom used, as a more ready and perfect adjustment for the draft is furnished in the machine. The cross-bar D is firmly bolted to the tongue or frame and extends out beyond the frame to the draft-line, as shown in Fig. 1. The ends of the tongue or frame are connected together in rear of the axle by the plate or bar F. This bar, in the form shown at Figs. 8 and 9, is made of cast-iron, and is provided in the middle with a socket, $a$, which is cast with it. If made of wood, the socket $a$ will be separately and suitably attached. Within the socket $a$ is placed a disk, $b$, of the form shown in cross-section in Fig. 13. This disk rotates easily in the socket $a$, and is provided with a pin or lip, $c$, which, as shown, stands in front of the evener E, so as to cause the disk to rotate whenever the evener E turns. The lip $c$ may be simply a pin and be set into the wood of the evener. These parts are connected together and the evener E attached to them by the bolt $d$. By this arrangement I can use a wooden evener without subjecting it to unusual wear, and without it being affected by any shrinking or swelling, and I also avoid any unnecessary friction. The evener E extends out beyond the sides of the split tongue or frame C, as shown in Fig. 1. To this evener I connect the rods M by hooks, eyebolts, or other suitable connection located near its ends. The forward ends of the rods M are connected with chains N, which chains pass around the wheel or roller O and connect with the rod Q, which rod Q also connects with the plate $v$ of the coupling-plate $o$. The wheel or roller O is supported by a sheave or forked plate, P, which may be cast in the form shown, or it may be made in halves bolted together. This sheave is supported upon the hangers R, which depend from the outer ends of the cross-bar D, and are connected therewith by hooks or eyebolts, as shown, or by such other means as will furnish a joint at or near that place. As shown, the hangers R and sheaves P are connected and held together by the hook or clevis of the whiffletrees S. The bar D is further supported in position by the brace-rods K, which connect its outer end with the axle by means of the collars or clips L. The brace-rods K' are connected with the axle at the inner ends of the horizontal parts, and their upper ends may be attached to the bar D, or to the tongue C direct.

It is evident that the rods M and Q may be continuations of the chain; but I prefer the form of construction shown.

The hanger R is provided with a series of holes, so that the hanger or sheave P may be moved up and down its length to adjust the draft of the team to the plows. The plate $v$ is provided also with holes, as shown in Fig. 2, so that the connection of the draft with the coupling may be made in line with the axle or above or below it. The adjustment on the hangers R is made to adjust the draft to the team, and, by dividing the draft between the evener on the frame and a direct connection with the coupling, all downdraft upon the necks of the horses is avoided, when the adjustment of the whiffletrees is properly made and a proper balance of the machine is obtained, and easy movement of the machine and its parts preserved. The adjustment of the direct draft by the plate $v$ is for adjusting the working of the coupling with the spring $m$, and for adjusting the draft so as to hold the plows down to their work when in the soil, and thereby counteracting the action of the spring, while the spring is allowed free action for raising or assisting in raising the beams and plows when the plows or shovels are out of the ground. The arrangement of the draft in this respect is also improved by connecting the draft through the jointed or moving hangers R and the pivoted evener E, as there can be no locking of the parts, even if both of the plows are lifted at the same time.

The plate $o$ is made in the form of an elongated half-box, as shown in Fig. 22. It is provided with a curved arm, $p$, against which the roller $n$ of the spring-arm $k$ operates. At the opposite end it is provided with the plate $v$, with which the draft-rods Q are connected at their rear ends. The coupling for the draft-plate $v$ is completed by the application of the half-box $q$, Fig. 23, to the outer end of the plate $o$. For the inner end of the plate $o$ an adjustable half-box, $r$, is provided, which half-box is secured to the plate $o$ by bolts, and may be adjusted along its length by the use of any two opposite holes of the series shown. By this arrangement of the half-box the space between the plow-beams is adjusted, and by means of an extension of the half-box provided with the pins $s$ the attachment of the beams is completed by the clevis $t$ $u$. The vertical movement of the beams is obtained by the rotation of the plate $o$ with its half-boxes upon the horizontal parts of the axle, and the horizontal movements are obtained by the rotation of the ends $t$ of the clevis upon the pins $s$ of the half-box $r$. A bolt may be used in the place of the pins $s$; but I prefer the form shown, as the pins may be cast with the half-box $r$.

Intermediate between the tongue or frame C and the horizontal portions A' of the axle, I attach a spring device to the vertical portions of the arch by means of the clevis $e$. As they are both alike, only one will be described. The inner half of the clip $e$ is made in the usual form for grasping a round bar. The outer half is provided with a pin, $j$, Figs 14 and 15, which pin is let into the arch to insure the non-rotation of the clip. This half of the clip is also provided with a hub, $g$, around which the spring $m$ is placed. The spring is held in position on the hub by the cap or plate $h$, which cap, as seen at Fig. 20, is provided with teeth or serrations, which fit corresponding teeth or serrations on the outer end of the hub $g$. The cap is also provided with the pin $i$, which fits against and holds the end $m'$ of the spring $m$, so that the tension of the spring can be regulated by means of the serrations and pin $i$, and when regulated or adjusted it is held by the bolt $h'$, which locks the serrations and holds the pin $i$ in its set position. Before the spring $m$ is placed in position the arm $k$ is placed on the inner end of the hub $g$, so as to swing or rotate thereon. This arm is provided with the pin $l$, against which the longer or other end of the spring $m$ rests or presses. The arm $k$ extends down, so that the pin or roller $n$ rests against the arm $p$ of the plate $o$, near its lower end or junction, as shown in Fig. 16. The arm $p$ is curved, so as to give the roller $n$ an easy movement in traversing its length. This arrangement of the bar $k$ and the spring $m$ with the coupling-plate $o$ gives the spring a strong compression and an easy movement on the beam when it is down, and when the rear end of the beam is elevated the spring presses against the arm $p$ and aids in raising the beam; and as the roller end traverses along the length of the arm $p$ it not only has the increased length of the arm for giving the spring a better action, but it brings the bar or spring-lever $k$ into such a position that it acts as brace to easily hold up the plow-beams.

The plow-beam clevises are made of malleable or other cast-iron, and are provided with heads or sockets $t$, fitting the pins $s$ of the half-boxes $r$, and they are made to form an angular plate, $u\ u'$, so that when any two are bolted together they form a box fitted to surround the front end of the plow-beam, as shown in Fig. 7. The part $u$ forms the narrower and $u'$ the wider portion of the angle-iron. They are held together by the bolt $t'$, and are provided with bolt-holes for their attachment to the plow-beams, as shown in Fig. 5.

The plow-beams G and the standards I, with their shovels, may be made of any of the usual forms adapted to double cultivators, the form shown being one made of iron, and the special form shown is claimed in another application of even date herewith; but for the purposes of this application they may be made, as stated, of any of the known forms. They are provided with the usual handles, and ordinary hang-up hooks are attached to the tongue or frame C.

The operation will be apparent from the description, and by this arrangement of the draft with the couplings and the frame-work I produce a cultivator which can be perfectly adjusted in all essential points, and while there are special advantages in attaching the rear end of the chain or rod Q to the adjusting coupling-plate $v$, I do not limit this part of my invention to an adjusting-coupling at this point, as part of the valuable features of my method of attaching the draft of the beam can be realized by making a direct connection with the axle or with the clip or collar L, or by a special clip provided for that purpose.

What I claim as new, and desire to secure by Letters Patent, is—

1. The chain N, or chain and rod, in combination with the sheave P O and coupling-plate $v$, and the evener-bar E, substantially as described.

2. The combination of the chain N, or chain and rods, coupling-plate $v$, evener-bar E, and sheave P O with the adjusting bracket or hanger R, substantially as set forth.

3. The combination of the chain N, or chain and rods, evener E, and sheave P O with the adjusting-hanger R and the adjusting-plate $v$ of the coupling, substantially as specified.

4. The combination of the hub $g$ with the swinging arm $k$, spring $m$, and adjusting-cap $h$, substantially as set forth.

5. The combination of the cap $h$, spring $m$, and arm $k$, supported on the hub $g$, with the coupling-plate $o$, having the arm $p$, substantially as specified.

6. The coupling-plate $o$, in combination with the half-box $q$ and the adjustable half-box $r$, substantially as described.

7. The coupling-plate $o$, in combination with the half-box $q$, the adjustable half-box $r$, and the draft-adjusting plate $v$, substantially as and for the purposes specified.

8. The combination of the plate $o$, half-boxes $q$ and $r$, plate $v$, and arm $p$ with the swinging spring-arm $k$, all constructed and operating substantially as specified.

9. The clip $e$, having the hub $g$, serrated at its end, and bolt $h'$, with the serrated cap $h$, having the pin $i$ for adjusting the tension of the spring, substantially as described.

LEROY GRAY.

Witnesses:
P. M. ALDEN,
JOHN LYNN.